United States Patent
Raghunathan et al.

(10) Patent No.: US 10,390,247 B2
(45) Date of Patent: Aug. 20, 2019

(54) APPARATUSES AND METHODS FOR CELL MEASURMENTS

(71) Applicant: QUALCOMM Incorporated, San Diego, CA (US)

(72) Inventors: Shravan Kumar Raghunathan, San Diego, CA (US); Parthasarathy Krishnamoorthy, San Diego, CA (US); Muthukumaran Dhanapal, San Diego, CA (US); Tian Mai, San Diego, CA (US); Scott Hoover, Del Mar, CA (US); Aiping Zhang, San Diego, CA (US); Kiran Gonuguntla, San Diego, CA (US); Shimayla Buchh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 15/254,959

(22) Filed: Sep. 1, 2016

(65) Prior Publication Data

US 2018/0063735 A1    Mar. 1, 2018

(51) Int. Cl.
*H04W 24/08* (2009.01)
*H04W 24/10* (2009.01)
*H04W 36/00* (2009.01)
*H04W 48/16* (2009.01)
*H04W 88/06* (2009.01)

(52) U.S. Cl.
CPC ......... *H04W 24/10* (2013.01); *H04W 24/08* (2013.01); *H04W 36/00835* (2018.08); *H04W 48/16* (2013.01); *H04W 88/06* (2013.01)

(58) Field of Classification Search
CPC .............................. H04W 24/08; H04W 24/10
See application file for complete search history.

(56) References Cited

U.S. PATENT DOCUMENTS

| 2011/0306345 A1* | 12/2011 | Wu ...................... H04W 24/10 455/436 |
| 2012/0236751 A1* | 9/2012 | Lee ...................... H04W 24/10 370/252 |
| 2014/0228016 A1* | 8/2014 | Futaki ............... H04W 36/0055 455/422.1 |
| 2015/0057046 A1* | 2/2015 | Challa .................. H04W 48/12 455/558 |

(Continued)

OTHER PUBLICATIONS

Partial International Search Report—PCT/US2017/048895—ISA/EPO—dated Oct. 23, 2017.

(Continued)

*Primary Examiner* — Redentor Pasia
(74) *Attorney, Agent, or Firm* — Paradice and Li LLP

(57) ABSTRACT

Examples described herein relate to systems and methods for a wireless communication device to manage cell measurements, including, but not limited to, performing measurements based on a first measurement configuration message received from a network, receiving a second measurement configuration message from the network before the measurements based on the first measurement configuration message are completed, and continuing to perform measurements based on the first measurement configuration message after receiving the second measurement configuration message.

18 Claims, 8 Drawing Sheets

(56) References Cited

U.S. PATENT DOCUMENTS

| | | | |
|---|---|---|---|
| 2015/0146694 A1* | 5/2015 | Gopal | H04W 36/0083 370/332 |
| 2015/0208327 A1* | 7/2015 | Baratam | H04W 48/16 455/432.1 |
| 2016/0183151 A1* | 6/2016 | Wu | H04W 36/30 370/332 |

OTHER PUBLICATIONS

International Search Report and Written Opinion—PCT/US2017/048895—ISA/EPO—dated Dec. 20, 2017.

* cited by examiner

APPARATUSES AND METHODS FOR CELL MEASUREMENTS

BACKGROUND

A wireless communication device, such as a mobile phone device or a smart phone, may include two or more Subscriber Identity Modules (SIMs). Each SIM may correspond to at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

In mobility scenarios in which a multi-SIM wireless communication device is mobile, a network (e.g., a LTE network) corresponding to a first subscription (e.g., enabled by a first SIM) can request the wireless communication device to perform measurements for various inter-RAT and/or inter-frequency neighbors for handover and/or reselection purposes. For instance, the network may send multiple measurement configuration messages via back-to-back Radio Resource Control (RRC) Over-The-Air (OTA) messages or SIB updates within a relatively short period of time. The manner in which the measurement configuration messages are processed can considerably impact performance on both the first subscription and second subscription (e.g., enabled by a second SIM), as well as power consumption.

However, existing processes can be inefficient in such scenarios. For instance, existing processes dictate that upon receiving a second measurement configuration message from the network that is different from a first measurement configuration message received prior in time, the wireless communication device aborts any on-going measurements based on the first measurement configuration message. Illustrating with an example related to LTE-to-TDS handover/reselection measurements on the first subscription, upon receiving a first RRC reconfiguration OTA message from the network, the wireless communication device initiates LTE-to-TDS measurements by starting an initial acquisition on a target TDS cell. Upon receiving a second RRC reconfiguration OTA message that adds neighbor RAT measurement information but does not modify the TDS measurement object (e.g., the target cell), the wireless communication device aborts the on-going acquisition on the target cell and restarts the acquisition on the same target cell based on the added information as a part of regular LTE-to-TDS measurements.

Therefore, restarting the on-going measurements can waste a considerable amount of time and power. In addition, performance of the second subscription (as well as additional subscription(s)) can be impacted due to prolonged usage of shared RF resource, interference, power back-off, and/or the like caused by the prolonged measurements on the first subscription. The reduction in user-experience with respect to the second subscription can also manifest in high chances of Circuit Switched (CS) call failure on the second subscription. Furthermore, the delay in measurement reporting to the network can also result, leading to consecutive failures in mobility handovers.

SUMMARY

Examples described herein relate to apparatuses and methods for enhancing overall performance and user experience of a multi-Subscriber Identity Module (SIM) wireless communication device with respect to measurements in cell reselection and handover. The wireless communication device may have a first subscription and a second subscription. The first subscription may be enabled by a first SIM. The second subscription may be enabled by a second SIM.

In some examples, the wireless communication device may receive a first measurement configuration message on the first subscription from a first mobile network associated with the first subscription. The wireless communication device may initiate measurements based on the first measurement configuration message. Before the measurements are completed, the wireless communication device may receive a second measurement configuration message from the first mobile network. Instead of aborting the unfinished measurements, the wireless communication device may parse the second measurement configuration message and appending new or modified measurement objects to a search list.

For instance, upon receiving the second measurement configuration message, the wireless communication device may identify a new measurement object, change in measurement objects, change in reporting mechanisms, and the like by comparing content of the first measurement configuration message and the second measurement configuration message. A non-limiting example of a measurement object may be, but not limited to, a target neighbor cell. Non-limiting examples of reporting mechanisms include reporting criteria such as, but not limited to, reporting configuration, reporting threshold, reporting interval, reporting Time-To-Trigger (TTT), and/or the like. The wireless communication device may append the new or changed measurement object, reporting mechanisms, and the like identified in the second measurement configuration message to the search list while continuing to perform measurements based on the first measurement configuration message.

According to some examples, a method for a wireless communication device to manage cell measurements includes performing measurements based on a first measurement configuration message received from a network, receiving a second measurement configuration message from the network before the measurements based on the first measurement configuration message are completed, and continuing to perform measurements based on the first measurement configuration message after receiving the second measurement configuration message.

In some examples, the method further includes receiving the first measurement configuration message from the network, and performing the measurements based on the first measurement configuration message in response to receiving the first measurement configuration message from the network.

In some examples, the method further includes performing measurements based on the second measurement configuration message in response to determining that the measurements based on the first measurement configuration message have been completed.

In some examples, the measurements based on the first measurement configuration message is performed while the wireless communication device is in a connected mode in relation to the network.

In some examples, the first measurement configuration message identifies a first target neighbor cell, and the second measurement configuration message identifies a second target neighbor cell.

In some examples, each of the first target neighbor cell and the second target neighbor cell is an inter-frequency neighbor cell or an inter-Radio Access Technology (RAT) neighbor cell to a serving cell.

In some examples, performing the measurements based on the first measurement configuration message includes performing an initial acquisition to camp on the first target neighbor cell.

In some examples, the method further includes adding the second target neighbor cell to a list of target neighbor cells to be measured.

In some examples, the measurements based on the first measurement configuration message are continued to be performed in response to one of: adding the second target neighbor cell to the list of target neighbor cells to be measured, or receiving the second measurement configuration message from the network.

In some examples, the first measurement configuration message identifies a first reporting criteria, and the second measurement configuration message identifies a second reporting criteria.

In some examples, each of the first reporting criteria and the second reporting criteria is a reporting configuration, reporting threshold, reporting interval, or reporting Time-To-Trigger (TTT).

In some examples, performing the measurements based on the first measurement configuration message includes of performing an initial acquisition to camp on a target neighbor cell using the first reporting criteria.

In some examples, the method further includes storing the second reporting criteria.

In some examples, the measurements based on the first measurement configuration message are continued to be performed in response to one of: storing the second reporting criteria, or receiving the second measurement configuration message from the network.

In some examples, each of the first measurement configuration message and the second measurement configuration message is a Radio Resource Control (RRC) reconfiguration Over-The-Air (OTA) message.

In some examples, the measurements based on the first measurement configuration message is performed while the wireless communication device is in an idle mode in relation to the network.

In some examples, the first measurement configuration message is a first System Information Block (SIB), and the second measurement configuration message is a second SIB.

In some examples, the method further includes parsing priority of the second SIB upon receiving the second SIB.

In some examples, parsing the priority of the second SIB includes lowering the priority of the second SIB to be below priority of the first SIB.

In some examples, the measurements are continued to be performed based on the first measurement configuration message as long as the priority of the second SIB is below the priority of the first SIB.

In some examples, the method further includes aborting the measurements based on the first measurement configuration message in response to determining that the priority of the second SIB is no longer below the priority of the first SIB.

In some examples, the measurements based on the first measurement configuration message are continued to be performed in response to parsing the priority of the second SIB.

In some examples, the method further includes performing measurements based on the second measurement configuration message in response to one of: the measurements based on the first measurement configuration message are completed, or the measurements based on the first measurement configuration message are aborted.

According to various examples, a wireless communication device, includes a RF resource, a processor configured to: perform measurements based on a first measurement configuration message received from a network, receive a second measurement configuration message from the network before the measurements based on the first measurement configuration message are completed, and continue to perform measurements based on the first measurement configuration message after receiving the second measurement configuration message, and a memory.

In some examples, the first measurement configuration message and the second measurement configuration message are conflicting.

According to various examples, a wireless communication device includes: means for performing measurements based on a first measurement configuration message received from a network, means for receiving a second measurement configuration message from the network before the measurements based on the first measurement configuration message are completed, and means for continuing to perform measurements based on the first measurement configuration message after receiving the second measurement configuration message.

According to various examples, a method for a wireless communication device to manage cell measurements includes: performing measurements based on a first measurement configuration message received from a network while in an idle mode, receiving a second measurement configuration message from the network before the measurements based on the first measurement configuration message are completed, and parsing priority of the second measurement configuration message such that measurements based on the first measurement configuration message can be continued after receiving the second measurement configuration.

In some examples, parsing the priority of the second measurement configuration message includes lowering the priority of the second measurement configuration message to be below priority of the first measurement configuration message.

In some examples, the method further includes continuing to perform the measurements based on the first measurement configuration message as long as the priority of the second measurement configuration message is below the priority of the first measurement configuration message.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Figure 1:
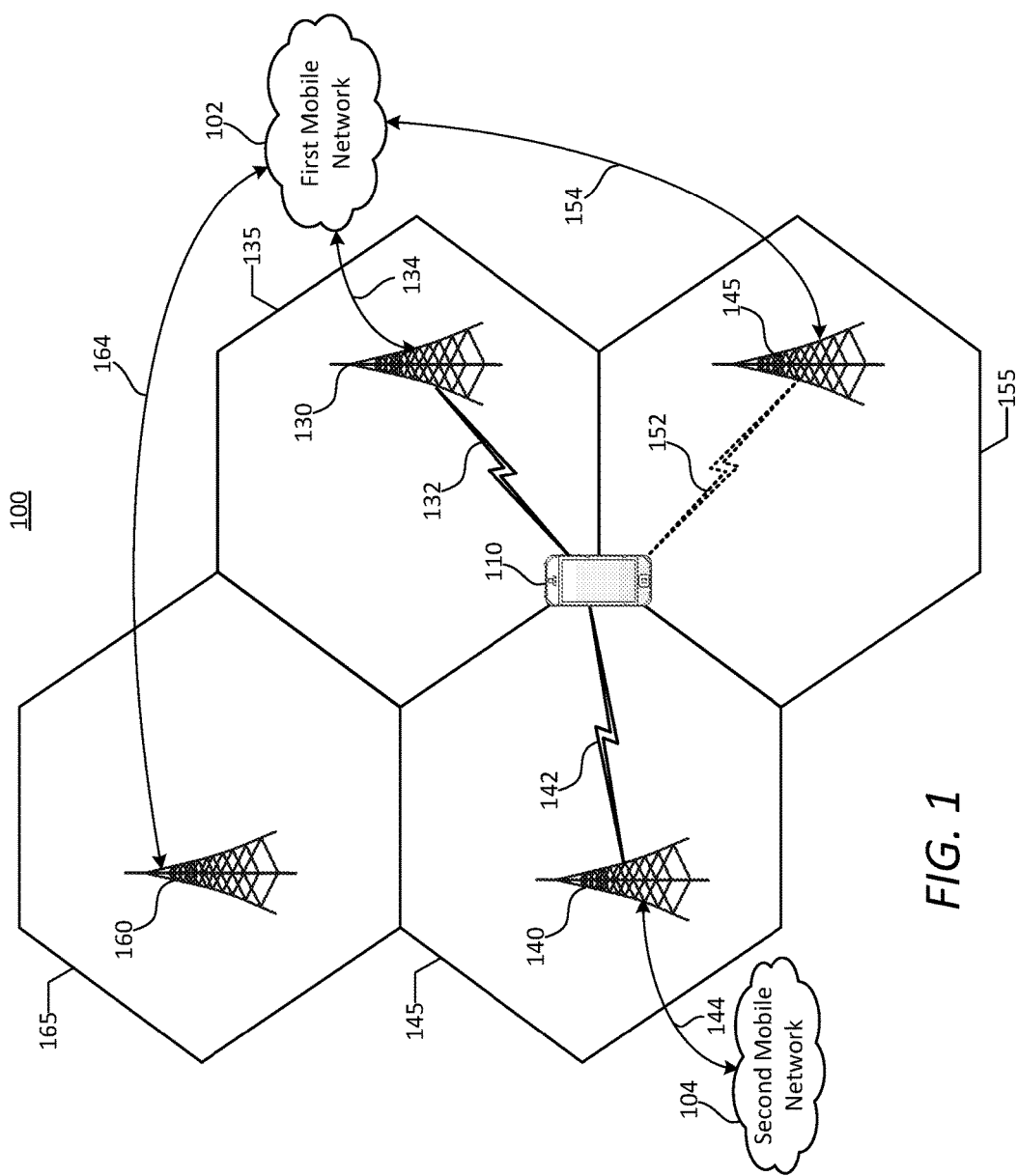
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, examples described herein may be applicable to all multi-SIM wireless communication devices. For instance, examples presented herein may be employed by a wireless communication device having a shared Radio Frequency (RF) resource and/or a MSMS wireless communication device having at least a first SIM enabling a first subscription and a second SIM enabling a second subscription. The examples may be applicable to a MSMA wireless communication device having two subscriptions. Furthermore, the examples may be applicable to a single-SIM wireless communication device having a single subscription (referred to herein as the first subscription).

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like)

associated with and enabled by the information (e.g., in the form of various parameters) stored in a particular SIM as the SIM and the communication network, as well as the services and RATs supported by that network, correlate to one another.

Various examples may be implemented within a communication system 100, an example of which is illustrated in FIG. 1. Referring to FIG. 1, a first mobile network 102 and second mobile network 104 may each associate with a plurality of cellular base stations. For instance, a first base station 130, first neighbor base station 150, second neighbor base station 160 may be associated with the first mobile network 102. A second base station 140 may be associated with the second mobile network 104. The first base station 130 may broadcast the first mobile network 102 in a first serving cell 135. The first neighbor base station 150 may broadcast the first mobile network 102 in a first neighbor cell 155. The second neighbor base station 160 may broadcast the first mobile network 102 in a second neighbor cell 165. The second base station 140 may broadcast the second mobile network 104 in a second serving cell 145. A wireless communication device 110 may be currently associated with (within effective boundaries of) the first serving cell 135 and the second serving cell 145.

The first base station 130 may be in communication with the first mobile network 102 over a wired or wireless connection 134. The second base station 140 may be in communication with the second mobile network 104 over a wired or wireless connection 144. The first neighbor base station 150 may be in communication with the first mobile network 102 over a wired or wireless connection 154. The second neighbor base station 160 may be in communication with the first mobile network 102 over a wired or wireless connection 164.

The wireless communication device 110 may be in communication with the first mobile network 102 through a first cellular connection 132 to the first base station 130. The first cellular connection 132 may correspond to the first RAT on the first subscription (enabled by the first SIM) of the wireless communication device 110. The wireless communication device 110 may be in communication with the second mobile network 104 through a second cellular connection 142 to the second base station 140. The second cellular connection 142 may correspond to the second RAT of the wireless communication device 110.

Each of the first neighbor cell 155 and second neighbor cell 165 may be inter-RAT or inter-frequency neighbor to the first serving cell 135. The first mobile network 102 may configure the wireless communication device 110 to perform measurements with respect to one or more of the first neighbor cell 155 and second neighbor cell 165 for inter-RAT or inter-frequency handover and/or reselection in mobility scenarios in which the wireless communication device 110 may be carried within or close to the boundaries of the first neighbor cell 155 or second neighbor cell 165.

The first cellular connection 132 and second cellular connection 142 may each be made through two-way wireless communication links. Examples of each of the first RAT and second RAT may include, but not limited to, FDMA, TDMA, CDMA (e.g., EVDO), UMTS (e.g., TDS, WCDMA, LTE, eMBMS, HSDPA, or the like), UTRA, GSM, 1×, GPRS, Wi-Fi, PCS, and/or another protocol used in a wireless communications network or a data communications network. By way of illustrating with a non-limiting example, the first RAT (employed by the cellular connection 132) may be LTE, or another suitable RAT. Illustrating with another non-limiting example, the second RAT (employed by the second cellular connection 142) may be LTE, WCDMA, UTRA, GSM, 1×, CDMA, or another suitable RAT.

In some examples, a potential cellular connection between the wireless communication device 110 and the first neighbor cell 155 or between the wireless communication device 110 and the second neighbor cell 165 may be the same as the first RAT. Alternatively in other examples, a potential cellular connection between the wireless communication device 110 and the first neighbor cell 155 or between the wireless communication device 110 and the second neighbor cell 165 may be different from the first RAT, as in an inter-RAT handover or reselection scenario.

Each of the first base station 130, second base station 140, first neighbor base station 150, and second neighbor base station 160 may include at least one antenna group or transmission station located in the same or different areas. The at least one antenna group or transmission station may be associated with signal transmission and reception. Each base station 130, 140, 150, or 160 may include one or more processors, modulators, multiplexers, demodulators, demultiplexers, antennas, and the like for performing the functions described herein. In some examples, each base station 130, 140, 150, or 160 may be an access point, Node B, evolved Node B (eNodeB or eNB), base transceiver station (BTS), or the like.

In various examples, the wireless communication device 110 may be configured to access the first mobile network 102 and the second mobile network 104 by virtue of the multi-SIM and/or the multi-mode SIM configuration of the wireless communication device 110. When a SIM corresponding to a RAT is inserted, the wireless communication device 110 may access the mobile communication network associated with that RAT based on the information stored on the SIM through registrations and call setups.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
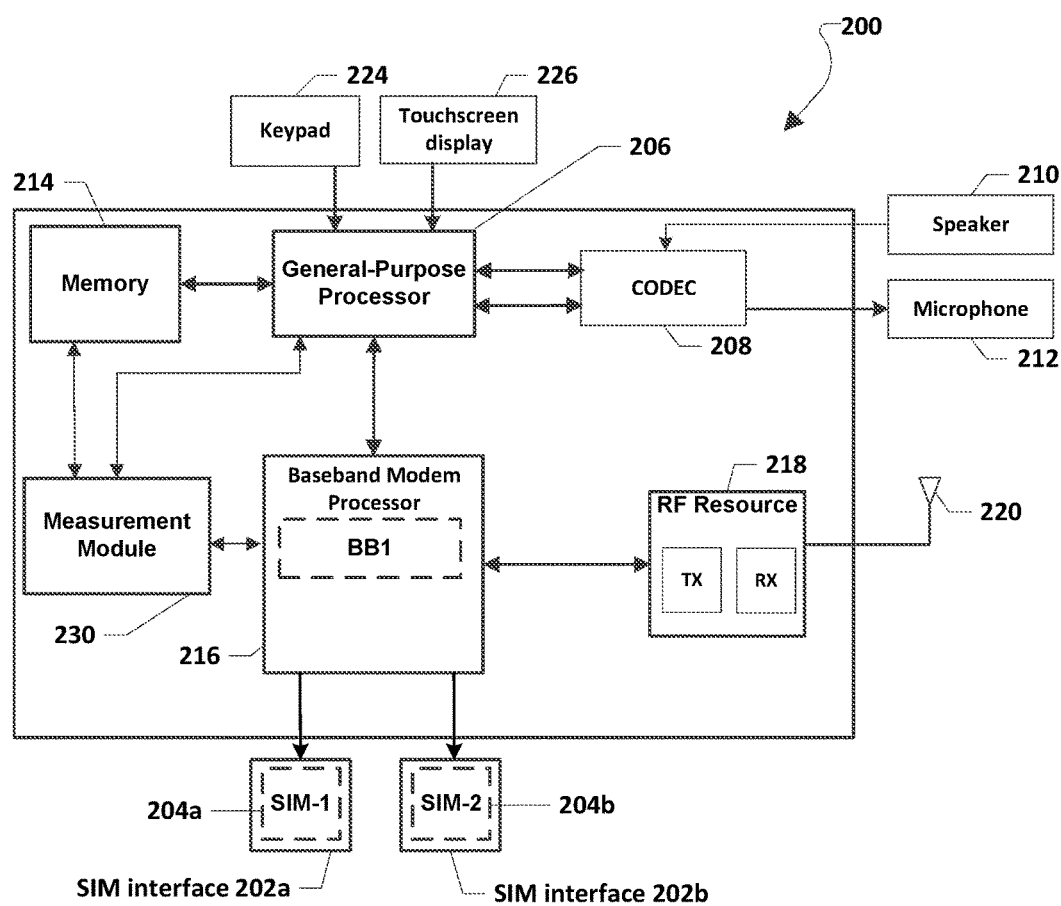
FIG. 2 is a component block diagram of a wireless communication device according to various examples.

FIG. 2 is a functional block diagram of a wireless communication device 200 suitable for implementing various examples. According to various examples, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a (the first SIM) that is associated with the first mobile network 102. The wireless communication device 200 may also include a second SIM interface 202b, which may receive a second identity module SIM-2 204b (the second SIM) that is associated with the second mobile network 104.

A SIM (e.g., SIM-1 204a, SIM-2 204b, and/or the like) in various examples may be a Universal Integrated Circuit Card (UICC) that is configured with SIM and/or Universal SIM (USIM) applications, enabling access to GSM, UMTS, or other suitable networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory (e.g., the memory 214) of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The examples described herein may be applicable to wireless communication devices in which the SIMs 204a and 204b share a common set of RF resource (particularly, the RF resource 218). The examples described herein may be applicable to wireless communication devices in which each of the SIMs 204a and 204b has a separate RF resource. The examples may be applied to a single-SIM wireless communication device having a single subscription such as the first subscription as described herein.

The RF resource 218 may include at least one transceiver that performs transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a measurement module 230. The measurement module 230 may configure the wireless communication device 200 to measure inter-frequency or inter-RAT neighbor cells (such as, but not limited to, the first neighbor cell 155, second neighbor cell 165, and the like) based on various reporting mechanisms and/or criteria described herein.

In some examples, the measurement module 230 may be implemented within the general-purpose processor 206. For example, the measurement module 230 may be implemented as a software application stored within the memory 214 and executed by the general-purpose processor 206. Accordingly, such examples can be implemented with minimal additional hardware costs. However, other examples relate to apparatuses and methods implemented with dedicated hardware specifically configured for performing operations described herein with respect to the measurement module 230. For example, the measurement module 230 may be implemented as a separate processing component (i.e., separate from the general-purpose processor 206). The measurement module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional mobile networks.

Figure 3:
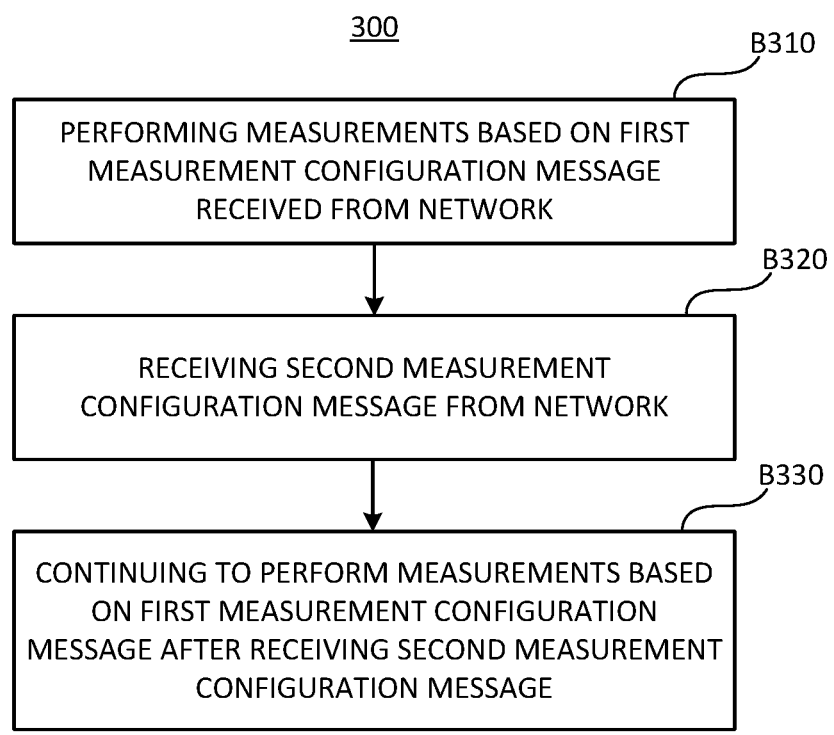
FIG. 3 is a process flowchart diagram illustrating a method for performing measurements according to various examples.

FIG. 3 is a process flowchart diagram illustrating an example of a method 300 for performing measurements according to various examples. Referring to FIGS. 1-3, in some examples, the method 300 may be performed by the measurement module 230 and/or the general-purpose processor 206 of the wireless communication device 200. The method 300 may be applicable while the wireless communication device 200 is in a connect mode in some examples. In other examples, the method 300 may be applicable while the wireless communication device 200 is in an idle mode. The first subscription may be enabled by the first SIM (SIM-1 204a). The second subscription may be enabled by the second SIM (SIM-2 204b).

At block B310, the measurement module 230 and/or the general-purpose processor 206 may perform measurements based on a first measurement configuration message received from a network (e.g., the first mobile network 102) associated with the first subscription. While the wireless communication device 200 is in the connected mode with respect to the first subscription, the first measurement configuration message may be a Radio Resource Control (RRC) reconfiguration Over-The-Air (OTA) message identifying a measurement object to be measured by the wireless communication device 200. The measurement object may be a target neighbor cell (e.g., the first neighbor cell 155). In some examples, the first measurement configuration message may be a RRC reconfiguration OTA message identifying reporting mechanisms, including reporting criteria such as, but not limited to, reporting configuration, reporting threshold, reporting interval, reporting Time-To-Trigger (TTT), and/or the like. While the wireless communication device 200 is in the idle mode with respect to the first subscription, the first measurement configuration message may be a first System Information Block (SIB).

At block B320, the measurement module 230 and/or the general-purpose processor 206 may configure the RF resource 218 to receive a second measurement configuration message from the network. Content of the second measurement configuration message may be different from or may otherwise conflict with content of the first measurement configuration message. For instance, the second measurement configuration message may add or modify at least one measurement object and/or reporting criteria while the wireless communication device 200 is in the connected mode. The second measurement configuration message may be a SIB update (updating the first SIB) while the wireless communication device 200 is in the idle mode. The measurement module 230 and/or the general-purpose processor 206 may identify the difference (e.g., the addition or modification) by comparing contents of the first measurement configuration message and second measurement configuration message.

At block B330, the measurement module 230 and/or the general-purpose processor 206 may continue to perform measurements based on the first measurement configuration message after receiving the second measurement configuration message, instead of aborting the measurement. In some examples, the measurement module 230 and/or the general-purpose processor 206 may parse or otherwise deprioritize the second measurement configuration message such that the measurements based on the first measurement configuration message may continue to be performed until completion. Measurements based on the second measurement configuration message may be performed after or in response to completion of the measurements based on the first measurement configuration message.

Figure 4:
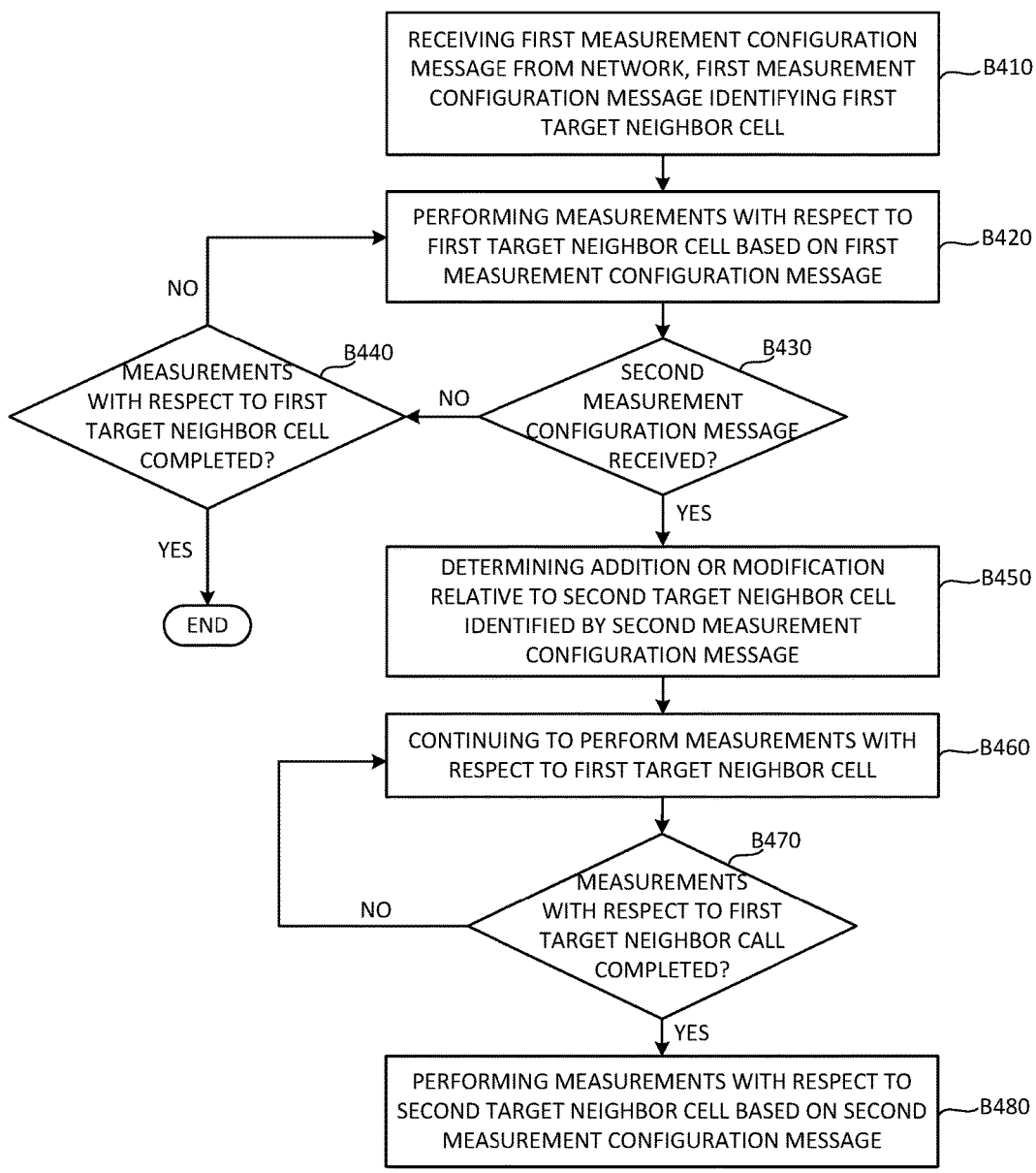
FIG. 4 is a process flowchart diagram illustrating a method for performing measurements in a connected mode according to various examples.

FIG. 4 is a process flowchart diagram illustrating an example of a method 400 for performing measurements in the connected mode according to various examples. Referring to FIGS. 1-4, one or more of blocks B410-B480 may correspond to one or more of blocks B310-B330. In some examples, the method 400 may be performed by the measurement module 230 and/or the general-purpose processor 206 of the wireless communication device 200. The method 400 may be applicable in a scenario in which the wireless communication device 200 receives the second measurement configuration message indicating addition to or modification of a measurement object (e.g., the target neighbor cell) set forth in the first measurement configuration message, while in the connect mode.

At block B410, the wireless communication device 200 may, via the RF resource 218, receive the first measurement configuration message from the network (e.g., the first mobile network 102) associated with the first subscription. The first measurement configuration message may identify a first target neighbor cell (e.g., the first neighbor cell 155), which may be an inter-frequency or inter-RAT neighbor to a current serving cell (e.g., the first serving cell 135).

The first measurement configuration message may be a first RRC reconfiguration OTA message. Illustrating with a non-limiting example, the first measurement configuration message may indicate a LTE-to-TDS inter-RAT measurement with the first neighbor cell 155 as a first measurement object ("Meas Object 1"). The first measurement object may be used for TDS measurement layer tied to Meas Id 1 for B1 measurement reporting. The first neighbor cell 155 may be a TDS cell.

At block B420, the measurement module 230 and/or the general-purpose processor 206 may perform measurements with respect to the first target neighbor cell based on the first measurement configuration message. For instance, the measurement module 230 and/or the general-purpose processor 206 may perform an initial acquisition procedure to camp on the first target neighbor cell.

At block B430, the measurement module 230 and/or the general-purpose processor 206 may determine whether the second measurement configuration message has been received via the RF resource 218. In response to determining that the second measurement configuration message has not been received (B430:NO), the measurement module 230 and/or the general-purpose processor 206 may determine whether measurements with respect to the first target neighbor cell have been completed, at block B440. In response to determining that the measurements with respect to the first target neighbor cell have been completed (B440:YES), the method 400 ends. On the other hand, in response to determining that the measurements with respect to the first target neighbor cell have not been completed (B440:NO), the measurement module 230 and/or the general-purpose processor 206 may continue to perform the measurements at block B420.

In response to determining that the second measurement configuration message has been received (B430:YES), the measurement module 230 and/or the general-purpose processor 206 may determine addition or modification relative to a second target neighbor cell (e.g., the second neighbor cell 165) identified by the second measurement configuration message, at block B450. In some examples, the second measurement configuration message may be a second RRC reconfiguration OTA message indicating adding the second target neighbor cell to be searched. In some examples, the second measurement configuration message may be a second RRC reconfiguration OTA message indicating modifying the first target neighbor cell to be the second target neighbor cell as the measurement object. In some examples, the second target neighbor cell may be associated with a different RAT (e.g., GSM) than that (e.g., TDS) of the first target neighbor cell. Illustrating with a non-limiting example, the second measurement configuration message may indicate a LTE-to-GSM inter-RAT measurement with the second neighbor cell 165 as a second measurement object ("Meas Object 2"). The second measurement object may be used for GSM measurement layer tied to Meas Id 2 for B1 measurement reporting. In other examples, the second target neighbor cell may be associated with the same RAT as that of the first target neighbor cell.

The content of the second measurement configuration message may be stored in the memory 214 or another suitable storage device. For instance, the second target neighbor cell may be appended to a list of target neighbor cells to be measured. In a scenario in which two or more target neighbor cells different from the first target neighbor cell have been identified by the first mobile network 102, the two or more target neighbor cells may be appended to the list in the order in which messages corresponding to the two or more target neighbor cells are received.

At block B460, the measurement module 230 and/or the general-purpose processor 206 may continue to perform the measurements with respect to the first target neighbor cell, instead of aborting such measurements. The measurements with respect to the first target neighbor cell may be continued in response to receiving the second measurement configuration message (B430:YES), in response to adding the second target neighbor cell to the list (storing the second target neighbor cell), and/or in response to determining the addition or modification (B450).

At block B470, the measurement module 230 and/or the general-purpose processor 206 may determine whether measurements with respect to the first target neighbor cell have been completed. In response to determining that the measurements with respect to the first target neighbor cell have not been completed (B470:NO), the measurement module 230 and/or the general-purpose processor 206 may continue to perform the measurements at block B460.

On the other hand, in response to determining that the measurements with respect to the first target neighbor cell have been completed (B470:YES), the measurement module 230 and/or the general-purpose processor 206 may perform measurements with respect to the second target neighbor cell based on the second measurement configuration message, at block B480. Illustrating with a non-limiting example, the measurement module 230 and/or the general-purpose processor 206 may determine a next target neighbor cell to be measured after the first neighbor cell 155 based on the list. In response to determining that the second neighbor cell 165 has the highest priority among other target neighbor cells on the list (except the first neighbor cell 155), measurements for the second neighbor cell 165 may be performed. Accordingly, measurements for both the first neighbor cell 155 and second target neighbor cell 165 may be completed by the wireless communication device 200. Measurement reports for the first neighbor cell 155 and second target neighbor cell 165 may be sent to the first mobile network 102 according to the reporting criteria contained in each of the first measurement configuration message and the second measurement configuration message, respectively.

Figure 5:
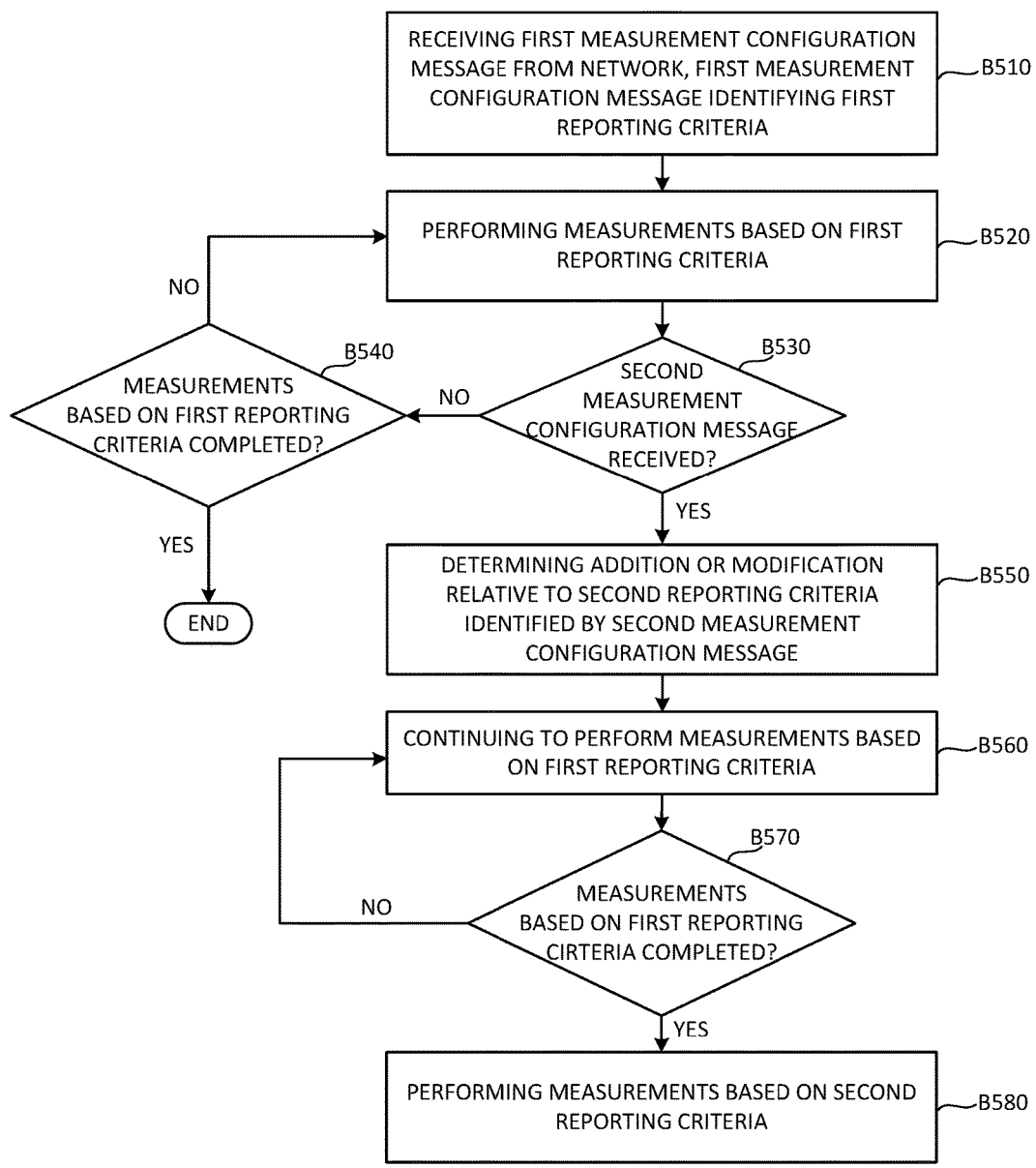
FIG. 5 is a process flowchart diagram illustrating a method for performing measurements in a connected mode according to various examples.

FIG. 5 is a process flowchart diagram illustrating an example of a method 500 for performing measurements in the connected mode according to various examples. Referring to FIGS. 1-3 and 5, one or more of blocks B510-B580 may correspond to one or more of blocks B310-B330. In some examples, the method 500 may be performed by the measurement module 230 and/or the general-purpose processor 206 of the wireless communication device 200. The method 500 may be applicable in a scenario in which the wireless communication device 200 receives the second measurement configuration message indicating addition to or modification of reporting criteria set forth in the first measurement configuration message, while in the connect mode.

At block B510, the wireless communication device 200 may, via the RF resource 218, receive the first measurement configuration message from the network (e.g., the first mobile network 102) associated with the first subscription. The first measurement configuration message may identify one or more first reporting criteria for measuring a target neighbor cell (e.g., the first neighbor cell 155).

Illustrating with a non-limiting example, the first reporting criteria may be a reporting configuration used to configure the measurement reporting of the wireless communication device 200. Examples of the reporting configuration may include, but not limited to, B1, B2, or the like. B1 may be triggered when link conditions of an inter-RAT neighbor cell (e.g., the target neighbor cell) exceed a threshold. B2 may be triggered when link conditions of a current serving cell (e.g., the first serving cell 135) deteriorates below a first threshold and link conditions of the inter-RAT neighbor cell exceed a second threshold.

Illustrating with other non-limiting examples, the reporting criteria may be, but not limited to, a reporting threshold, reporting interval, reporting TTT, and/or the like. In some examples, the measurement module 230 and/or the general-purpose processor 206 may send a measurement report with respect to a certain cell (e.g., the target neighbor cell) to the first mobile network 102 if measured link quality meets the reporting threshold. The link quality may be measured in Received Signal Code Power (RSCP), Reference Signal Received Power (RSRP), and/or the like. In some examples, the reporting interval may specify a time interval in which the measurement module 230 and/or the general-purpose processor 206 may send the measurement report to the first mobile network 102. In some examples, the reporting TTT may refer to time that the measurement report is sent to the first mobile network 102. Examples described herein can be implemented with other suitable reporting criteria such as, but not limited to, reporting measurement count and the like.

The first measurement configuration message may be a first RRC reconfiguration OTA message. Illustrating with a non-limiting example, the first measurement configuration message may indicate one or more reporting criteria as described for a LTE-to-TDS inter-RAT measurement with the first neighbor cell 155 as a measurement object ("Meas Object 1"). The measurement object may be used for TDS measurement layer tied to Meas Id 1 for B1 measurement reporting based on parameters such as, but not limited to, the reporting threshold, reporting interval, reporting TTT, and/ or the like.

At block B520, the measurement module 230 and/or the general-purpose processor 206 may perform measurements (with respect to the target neighbor cell) based on the first reporting criteria. Illustrating with the non-limiting example, the measurement module 230 and/or the general-purpose processor 206 may perform an initial acquisition procedure to camp on the first neighbor cell 155 using B1, the reporting threshold, reporting interval, reporting TTT, and/or the like set forth in the first measurement configuration message.

At block B530, the measurement module 230 and/or the general-purpose processor 206 may determine whether the second measurement configuration message has been received via the RF resource 218. In response to determining that the second measurement configuration message has not been received (B530:NO), the measurement module 230 and/or the general-purpose processor 206 may determine whether measurements based on the first reporting criteria have been completed, at block B540. In response to determining that the measurements based on the first reporting criteria have been completed (B540:YES), the method 500 ends. On the other hand, in response to determining that the measurements based on the first reporting criteria have not been completed (B540:NO), the measurement module 230 and/or the general-purpose processor 206 may continue to perform the measurements at block B520.

In response to determining that the second measurement configuration message has been received (B530:YES), the measurement module 230 and/or the general-purpose processor 206 may determine addition or modification relative to a second reporting criteria identified by the second measurement configuration message, at block B550. In some examples, the second measurement configuration message may be a second RRC reconfiguration OTA message indicating adding the second reporting criteria for measuring the target neighbor cell. In some examples, the second measurement configuration message may be a second RRC reconfiguration OTA message indicating modifying the first reporting criteria to be the second reporting criteria for measuring the target neighbor cell. Illustrating with a non-limiting example, the second measurement configuration message may indicate replacing B1 with B2 for measuring Meas Object 1. Illustrating with other non-limiting examples, the second measurement configuration message may indicate replacing the reporting threshold, reporting interval, reporting TTT, and/or the like set forth in the first measurement configuration message with corresponding criteria set forth in the second measurement configuration message for measuring Meas Object 1.

The content of the second measurement configuration message may be stored in the memory 214 or another suitable storage device. For instance, the second reporting criteria may be appended to a list of reporting criteria based on which the target neighbor cell is to be measured. In a scenario in which two or more reporting criteria are different (e.g., new or modified) from the first reporting criteria have been identified by the first mobile network 102, the two or more reporting criteria may be appended to the list in the order in which messages corresponding to the two or more reporting criteria are received.

At block B560, the measurement module 230 and/or the general-purpose processor 206 may continue to perform the measurements based on the first reporting criteria, instead of aborting such measurements. The measurements with respect to the first reporting criteria may be continued in response to receiving the second measurement configuration message (B530:YES), in response to adding the second reporting criteria to the list (storing the second reporting criteria), or in response to determining the addition or modification (B550).

At block B570, the measurement module 230 and/or the general-purpose processor 206 may determine whether measurements based on the first reporting criteria have been completed. In response to determining that the measurements based on the first reporting criteria have not been completed (B570:NO), the measurement module 230 and/or the general-purpose processor 206 may continue to perform the measurements at block B560.

On the other hand, in response to determining that the measurements with respect to the first target neighbor cell have been completed (B570:YES), the measurement module 230 and/or the general-purpose processor 206 may perform measurements based on the second reporting criteria message, at block B580. Illustrating with a non-limiting example, the measurement module 230 and/or the general-purpose processor 206 may determine a next reporting criteria based on the list. In response to determining that the second reporting criteria has the highest priority among other reporting criteria on the list (except the first reporting criteria), measurements based on the second reporting criteria may be performed. Accordingly, measurements based on both the first reporting criteria and second reporting criteria may be completed by the wireless communication device 200. Measurement reports may be sent to the first mobile network 102 according to the reporting criteria contained in each respective one of the first measurement configuration message and the second measurement configuration message.

Figure 6:
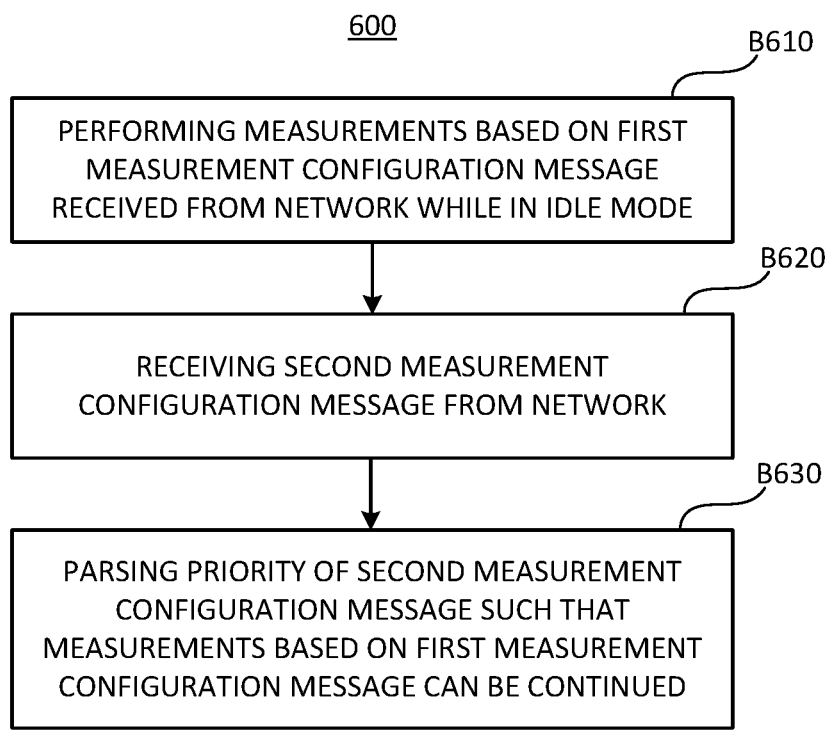
FIG. 6 is a process flowchart diagram illustrating a method for performing measurements in an idle mode according to various examples.

FIG. 6 is a process flowchart diagram illustrating an example of a method 600 for performing measurements according to various examples. Referring to FIGS. 1-3 and 6, the method 600 may be performed by the measurement module 230 and/or the general-purpose processor 206 of the wireless communication device 200. The method 600 may be applicable while the wireless communication device 200 is in the idle mode in some examples.

At block B610, the measurement module 230 and/or the general-purpose processor 206 may perform measurements based on a first measurement configuration message received from a network (e.g., the first mobile network 102) associated with the first subscription while in the idle mode. The first measurement configuration message may be a first SIB specifying parameters for measurements of a target neighbor cell (e.g., the first neighbor cell 155). The first SIB may be broadcasted by the network. The measurement object may be the target neighbor cell. For instance, SIB 5 may include inter-frequency LTE measurement information, SIB 6 may include inter-RAT measurements for TDS and/or WCDMA, SIB 7 may include inter-RAT measurements for GSM, SIB 8 may include inter-RAT measurements for EVDO, and/or the like. Illustrating with a non-limiting example, the first SIB (e.g., SIB 6) may indicate a LTE-to-TDS inter-RAT measurements for the first neighbor cell 155.

At block B620, the measurement module 230 and/or the general-purpose processor 206 may receive the second measurement configuration message from the network. In some examples, the second measurement configuration message may be a second SIB (e.g., in the case of a SIB update) that updates one or more parameters specified in the first SIB. That is, the second SIB may include new or modified system information related to the measurements. Illustrating with a non-limiting example, the second SIB (e.g., SIB 8) may indicate a LTE-to-GSM inter-RAT measurements for the second neighbor cell 165, instead of the LTE-to-TDS inter-RAT measurements for the first neighbor cell 155 indicated by the first SIB (e.g., SIB 6).

At block B630, the measurement module 230 and/or the general-purpose processor 206 may parse priority of the second measurement configuration message such that measurements based on the first measurement configuration message can be continued after receiving the second measurement configuration message. Each SIB is associated with a priority according to suitable protocol or assigned by the first mobile network 102. In the event that the second SIB is associated with a higher priority as compared to that of the first SIB, instead of aborting the measurements based on the first SIB due to the higher priority of the second SIB, the measurement module 230 and/or the general-purpose processor 206 may parse the priority of the second SIB such that measurements based on the first SIB can be continued. In some examples, parsing the priority of the second SIB includes manipulating (lowering) the priority of the second SIB to be lower than the priority of the first SIB, upon receiving the second SIB. The measurements based on the first SIB may be continued in response to parsing the priority of the second SIB. The measurements based on the first SIB may be continued to be performed as long as the priority of the second SIB is below the priority of the first SIB.

In some examples, the measurement module 230 and/or the general-purpose processor 206 may abort the measurements based on the first SIB in response to determining that the priority of the second SIB is no longer below the priority of the first SIB. In some examples, upon completion or abortion of the measurements based on the first SIB, the measurement module 230 and/or the general-purpose processor 206 may initiate measurements based on the second SIB.

Figure 7:
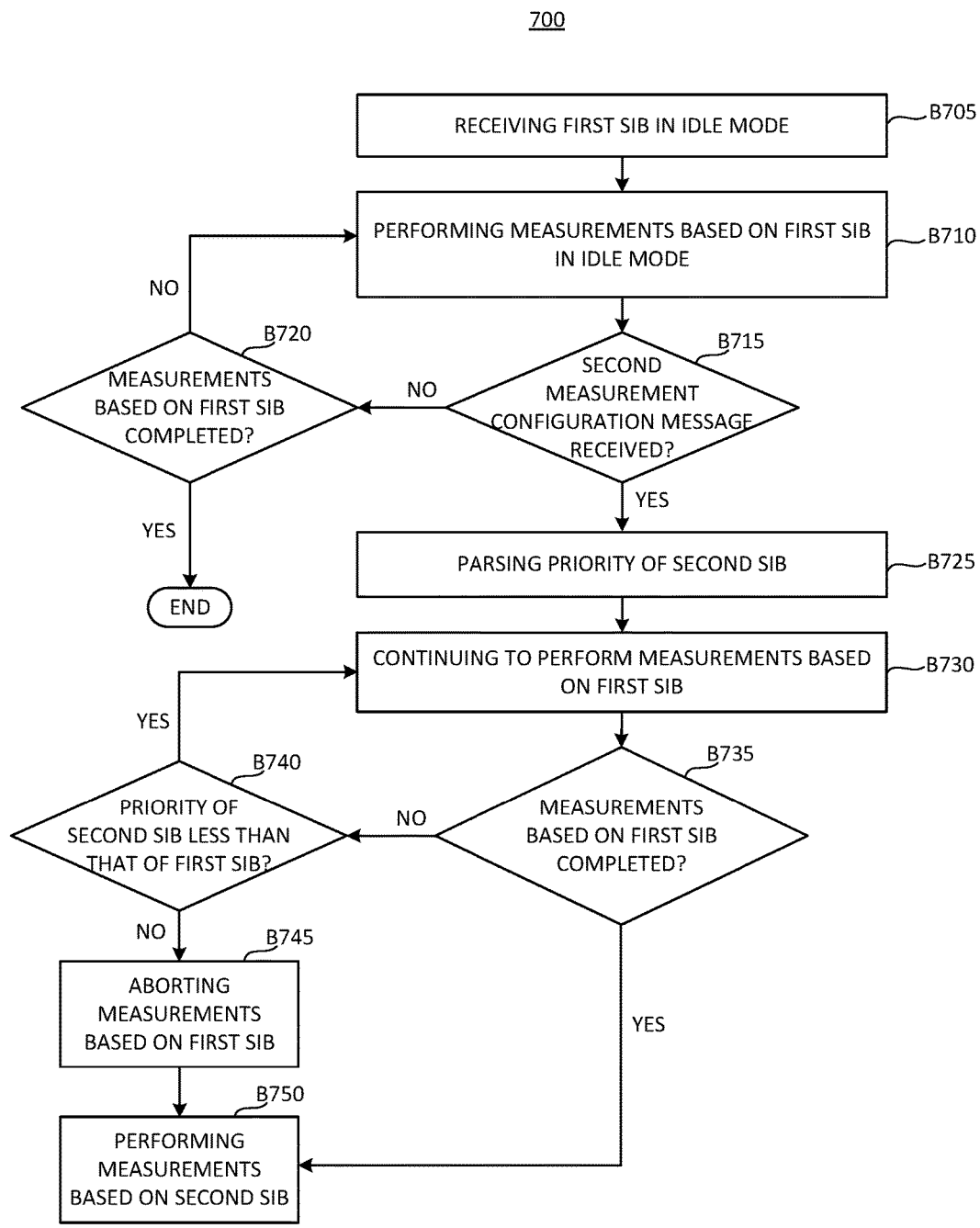
FIG. 7 is a process flowchart diagram illustrating a method for performing measurements in an idle mode according to various examples.

FIG. 7 is a process flowchart diagram illustrating an example of a method 700 for performing measurements in the idle mode according to various examples. Referring to FIGS. 1-3, 6, and 7, one or more of blocks B705-B750 may correspond to one or more of blocks B310-B330 or one or more of blocks B610-B630. In some examples, the method 700 may be performed by the measurement module 230 and/or the general-purpose processor 206 of the wireless communication device 200. The method 700 may be applicable in a scenario in which the wireless communication device 200 receives the second measurement configuration message (e.g., the second SIB) that updates the first measurement configuration message (e.g., the first SIB), while in the idle mode.

At block B705, the wireless communication device 200 may, via the RF resource 218, receive the first SIB from the network (e.g., the first mobile network 102) in the idle mode. Illustrating with a non-limiting example, the first SIB may include system information for performing a LTE-to-TDS inter-RAT measurement with the target neighbor cell (e.g., the first neighbor cell 155).

At block B710, the measurement module 230 and/or the general-purpose processor 206 may perform measurements based on the first SIB in the idle mode. For instance, the measurement module 230 and/or the general-purpose processor 206 may perform an initial acquisition procedure to camp on the target neighbor cell using the system information contained in the first SIB.

At block B715, the measurement module 230 and/or the general-purpose processor 206 may determine whether the second SIB has been received via the RF resource 218. In response to determining that the second SIB has not been received (B715:NO), the measurement module 230 and/or the general-purpose processor 206 may determine whether measurements based on the first SIB have been completed, at block B720. In response to determining that the measurements based on the first SIB have been completed (B715:YES), the method 700 ends. On the other hand, in response to determining that the measurements based on the first SIB have not been completed (B715:NO), the measurement module 230 and/or the general-purpose processor 206 may continue to perform the measurements at block B710.

In response to determining that the second SIB has been received (B715:YES), the measurement module 230 and/or the general-purpose processor 206 may parse the priority of the second SIB, at block B725. In some examples, the second SIB may be a SIB update containing system information updating system information contained in to the first SIB. The measurement module 230 and/or the general-purpose processor 206 may compare the first SIB and second SIB to determine any SIB updates (e.g., any addition or modification). The second SIB may have a higher priority than the first SIB based on conventional processes (e.g., conventional protocols or network-assigned priority). The measurement module 230 and/or the general-purpose processor 206 may parse the priority of the second SIB to be lower than that of the first SIB. Thus, measurements based on the first SIB can be continued. The content of the second SIB may be stored in the memory 214 or another suitable storage device. For instance, the system information included in the second SIB may be appended to a list of SIBs based on which measurements are to be performed. In a scenario in which two or more different SIBs (e.g., two or more different SIB updates) have been received from the first mobile network 102 after the first SIB, the two or more SIBs may be appended to the list in the order in which the SIBs are received.

At block B730, the measurement module 230 and/or the general-purpose processor 206 may continue to perform the measurements based on the first SIB (e.g., the first SIB), instead of aborting such measurements. The measurements based on the first SIB may be continued in response to receiving the second SIB (B715:YES), in response to adding the second SIB to the list (storing the second SIB), in response to parsing the second SIB, or in response to determining that the second SIB updates the first SIB.

At block B735, the measurement module 230 and/or the general-purpose processor 206 may determine whether measurements based on the first SIB have been completed. In response to determining that the measurements based on the first SIB have not been completed (B735:NO), the measurement module 230 and/or the general-purpose processor 206 may determine whether the priority of the second SIB is less than that of the first SIB, at block B740.

In response to determining that the priority of the second SIB remains below that of the first SIB (B740:YES), the measurement module 230 and/or the general-purpose processor 206 may continue to perform the measurements at block B730. On the other hand, in response to determining that the priority of the second SIB is no longer below that of the first SIB (B740:NO), the measurement module 230 and/or the general-purpose processor 206 may abort the measurements based on the first SIB, at block B745.

At block B750, the measurement module 230 and/or the general-purpose processor 206 may perform measurements based on the second SIB. Illustrating with a non-limiting example, the measurement module 230 and/or the general-purpose processor 206 may determine a next SIB be used for measurements based on the list. In response to determining that the second SIB has the highest priority among other SIBs on the list (except the first SIB), measurements using the second SIB may be performed. In addition, in response to determining that the measurements based on the first SIB have been completed (B720;YES), the measurement module 230 and/or the general-purpose processor 206 may perform measurements based on the second SIB at block B750. Accordingly, measurements for both the first SIB and second SIB may be completed by the wireless communication device 200. Measurement reports corresponding to the first SIB and second SIB may be sent to the first mobile network 102 according to the reporting criteria or other parameter or suitable protocols contained in each of the respective one of the first SIB and second SIB.

It follows that the examples presented herein can avoid unnecessary interruption or abortion of acquisition procedures and reacquisition procedures and can expedite measurements such that the wireless communication device 200 can send measurement report to the first mobile network 102 in a timely fashion. Power consumed by aborted acquisition procedures can also be conserved by completing and obtaining results for such acquisition, instead of aborting. Therefore, mobility handover success rates can be significantly improved given that the RF resource 218 is freed quickly to other subscriptions (e.g., the second subscription). For instance, probably CS call failures can be avoided on the second subscription.

Figure 8:
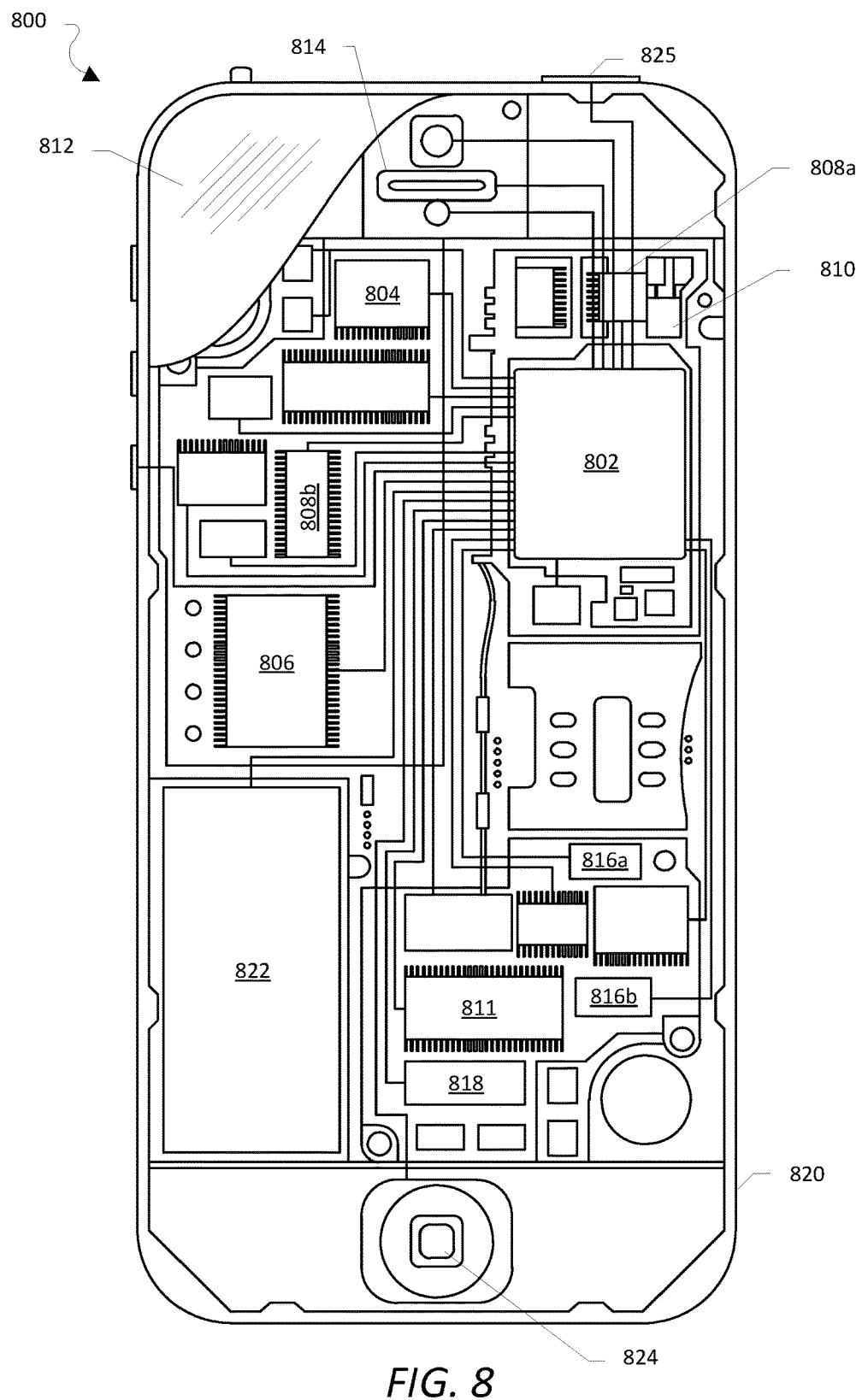
FIG. 8 is a component block diagram of a wireless communication device suitable for use with various examples.

The various examples may be implemented in any of a variety of wireless communication devices 110 and 200, an example of which is illustrated in FIG. 8, as wireless communication device 800. As such, the wireless communication device 800 may implement the process and/or the apparatus of FIGS. 1-7, as described herein.

With reference to FIGS. 1-8, the wireless communication device 800 may include a processor 802 coupled to a touchscreen controller 804 and an internal memory 806. The processor 802 may be one or more multi-core integrated circuits designated for general or specific processing tasks. The memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the wireless communication device 800 need not have touch screen capability.

The wireless communication device 800 may have one or more cellular network transceivers 808a, 808b coupled to the processor 802 and to at least one antenna 810 and configured for sending and receiving cellular communications. The transceivers 808a, 808b and antenna 810 may be used with the above-mentioned circuitry to implement the various example methods. The cellular network transceivers 808a, 808b may be the RF resource 218. The antenna 810 may be the antenna 220. The wireless communication device 800 may include two or more SIM cards 816a, 816b, corresponding to SIM-1 204a (the first SIM) and SIM-2 204b (the second SIM), coupled to the transceivers 808a, 808b and/or the processor 802. The wireless communication device 800 may include a cellular network wireless modem chip 811 (e.g., the baseband modem processor 216) that enables communication via at least one cellular network and is coupled to the processor 802.

The wireless communication device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown).

The wireless communication device 800 may also include speakers 814 for providing audio outputs. The wireless communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to a peripheral device connection port (not shown) to receive a charging current from a source external to the wireless communication device 800. The wireless communication device 800 may also include a physical button 824 for receiving user inputs. The wireless communication device 800 may also include a power button 826 for turning the wireless communication device 800 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but is to be accorded the widest scope consistent with the following claims and the principles and novel features disclosed herein.

What is claimed is:

1. A method for a wireless communication device to manage cell measurements, the method comprising:
   receiving a first measurement configuration message received from a network, wherein the first measurement configuration message is a first System Information Block (SIB);
   receiving a second measurement configuration message from the network before the measurements based on the first measurement configuration message are completed, wherein the second measurement configuration message is a second SIB;
   lowering a priority of the second SIB to less than a priority of the first SIB;
   performing measurements based on the first measurement configuration message after receiving the second measurement configuration message;
   aborting performing the measurements based on the first measurement configuration message in response to determining that the priority of the second SIB is no longer less than the priority of the first SIB; and
   performing measurements based on the second measurement configuration message in response to determining that the performing measurements based on the first measurement configuration message have been aborted.

2. The method of claim 1, wherein
   performing the measurements based on the first measurement configuration message in response to receiving the first measurement configuration message from the network.

3. The method of claim 1, wherein the measurements based on the first measurement configuration message are performed while the wireless communication device is in a connected mode with respect to the network.

4. The method of claim 3, wherein:
   the first measurement configuration message identifies a first target neighbor cell; and
   the second measurement configuration message identifies a second target neighbor cell.

5. The method of claim 4, wherein each of the first target neighbor cell and the second target neighbor cell is an inter-frequency neighbor cell or an inter-Radio Access Technology (RAT) neighbor cell to a serving cell.

6. The method of claim 4, wherein performing the measurements based on the first measurement configuration message comprises performing an initial acquisition to camp on the first target neighbor cell.

7. The method of claim 3, further comprising adding the second target neighbor cell to a list of target neighbor cells to be measured.

8. The method of claim 7, wherein the measurements based on the first measurement configuration message are continued to be performed in response to one of:
   adding the second target neighbor cell to the list of target neighbor cells to be measured; or
   receiving the second measurement configuration message from the network.

9. The method of claim 3, wherein:
   the first measurement configuration message identifies a first reporting criteria; and
   the second measurement configuration message identifies a second reporting criteria.

10. The method of claim 9, wherein each of the first reporting criteria and the second reporting criteria is a reporting configuration, reporting threshold, reporting interval, or reporting Time-To-Trigger (TTT).

11. The method of claim 9, wherein performing the measurements based on the first measurement configuration message comprises of performing an initial acquisition to camp on a target neighbor cell using the first reporting criteria.

12. The method of claim 9, further comprising storing the second reporting criteria.

13. The method of claim 12, wherein the measurements based on the first measurement configuration message are continued to be performed in response to one of:
   storing the second reporting criteria; or
   receiving the second measurement configuration message from the network.

14. The method of claim 3, wherein the first measurement configuration message and the second measurement configuration message are each a Radio Resource Control (RRC) reconfiguration Over-The-Air (OTA) message.

15. The method of claim 1, wherein the measurements based on the first measurement configuration message are performed while the wireless communication device is in an idle mode with respect to the network.

16. A wireless communication device, comprising:
a Radio Frequency (RF) resource;
a processor; and
a memory storing instructions that, when executed by the processor, cause the wireless communication device to:
receive a first measurement configuration message from a network, wherein the first measurement configuration message is a first System Information Block (SIB);
receive a second measurement configuration message from the network before the measurements based on the first measurement configuration message are completed, wherein the second measurement configuration message is a second SIB;
lowering a priority of the second SIB to less than a priority of the first SIB;
perform measurements based on the first measurement configuration message after receiving the second measurement configuration message;
abort performing the measurements based on the first measurement configuration message in response to determining that the priority of the second SIB is no longer less than the priority of the first SIB; and
perform measurements based on the second measurement configuration message in response to a determination that performing the measurements based on the first measurement configuration message have been aborted.

17. The wireless communication device of claim 16, wherein the first measurement configuration message conflicts with the second measurement configuration message.

18. A wireless communication device, comprising:
means for receiving a first measurement configuration message received from a network, wherein the first measurement configuration message is a first System Information Block (SIB);
means for receiving a second measurement configuration message from the network before the measurements based on the first measurement configuration message are completed, wherein the second measurement configuration message is a second SIB;
means for lowering a priority of the second SIB to less than a priority of the first SIB;
means for performing measurements based on the first measurement configuration message after receiving the second measurement configuration message;
means for aborting performing the measurements based on the first measurement configuration message in response to determining that the priority of the second SIB is no longer less than the priority of the first SIB; and
means for performing measurements based on the second measurement configuration message in response to determining that the measurements based on the first measurement configuration message have been aborted.

* * * * *